US007920746B2

(12) United States Patent
Silverstein et al.

(10) Patent No.: US 7,920,746 B2
(45) Date of Patent: Apr. 5, 2011

(54) COMPRESSED DOMAIN IMAGE SUMMATION APPARATUS, SYSTEMS, AND METHODS

(75) Inventors: Amnon Silverstein, Mountain View, CA (US); Sheng Lin, Sunnyvale, CA (US); Brian Rodricks, Los Gatos, CA (US)

(73) Assignee: Aptina Imaging Corporation, George Town (KY)

( * ) Notice: Subject to any disclaimer, the term of this patent is extended or adjusted under 35 U.S.C. 154(b) by 1016 days.

(21) Appl. No.: 11/738,897

(22) Filed: Apr. 23, 2007

(65) Prior Publication Data

US 2008/0260265 A1 Oct. 23, 2008

(51) Int. Cl.
*G06K 9/36* (2006.01)
*G06K 9/46* (2006.01)
(52) U.S. Cl. ...................................................... 382/232
(58) Field of Classification Search .......... 382/218–220, 382/232, 233, 236, 238, 276, 284, 305, 312, 382/315; 348/208.4, 222.1, 231.99, 296, 348/333.11, 362, E3.002, E3.018, E5.037; 375/240.06, 240.12, 240.23, 240.24, 240.27, 375/240.29, E7.081; 711/170; 358/474, 358/497
See application file for complete search history.

(56) References Cited

U.S. PATENT DOCUMENTS

| | | | |
|---|---|---|---|
| 4,445,118 A | 4/1984 | Taylor et al. | |
| 4,635,203 A | 1/1987 | Merchant | |
| 5,410,346 A | 4/1995 | Saneyoshi et al. | |
| 5,535,288 A | 7/1996 | Chen et al. | |
| 5,579,444 A | 11/1996 | Dalziel et al. | |
| 5,703,965 A * | 12/1997 | Fu et al. ........................ | 382/232 |
| 5,768,430 A | 6/1998 | Takashima et al. | |
| 5,777,756 A | 7/1998 | Hidari | |
| 5,907,413 A * | 5/1999 | Han ............................... | 358/497 |
| 6,285,801 B1 | 9/2001 | Mancuso et al. | |
| 6,289,112 B1 | 9/2001 | Jain et al. | |
| 6,408,101 B1 | 6/2002 | Krishnamurthy et al. | |
| 6,415,054 B1 * | 7/2002 | Silverbrook et al. .......... | 382/233 |
| 6,590,937 B1 | 7/2003 | Ogura et al. | |
| 6,658,145 B1 | 12/2003 | Silver et al. | |
| 6,678,590 B1 | 1/2004 | Burchfiel | |
| 6,862,369 B2 | 3/2005 | Kondo | |
| 6,909,797 B2 | 6/2005 | Romsdahl et al. | |
| 6,912,310 B1 | 6/2005 | Park et al. | |
| 7,054,367 B2 | 5/2006 | Oguz et al. | |
| 7,542,614 B2 | 6/2009 | Silverstein et al. | |
| 7,612,803 B2 * | 11/2009 | Meitav et al. ............... | 348/222.1 |

(Continued)

FOREIGN PATENT DOCUMENTS

EP 0811951 A2 12/1997

(Continued)

OTHER PUBLICATIONS

Jing, Xiao-Yuan, et al., "A Face and Palmprint Recognition Approach Based on Discriminant DCT Feature Extraction", *IEEE Transactions on Systems, Man and Cybernetics, Part B*, 34(6), (Dec. 2004),2405-2415.

(Continued)

*Primary Examiner* — Amir Alavi

(57) ABSTRACT

Apparatus, systems, and methods disclosed herein may transpose image blocks from successively-captured versions of an image according to relative movement between an image capture device and the scene being captured. The transposition may provide for alignment of the successively-captured images notwithstanding the movement. The transposed image blocks from the successive images are composited in the frequency domain by integrating frequency domain coefficients from each into a composite final image. Additional embodiments are disclosed.

31 Claims, 9 Drawing Sheets

U.S. PATENT DOCUMENTS

| | | | |
|---|---|---|---|
| 2002/0149693 A1 | 10/2002 | Tantalo et al. | |
| 2003/0117511 A1 | 6/2003 | Belz et al. | |
| 2003/0138149 A1 | 7/2003 | Iizuka et al. | |
| 2003/0174772 A1 | 9/2003 | Voronov et al. | |
| 2004/0239795 A1 | 12/2004 | Kitajima | |
| 2006/0056835 A1 | 3/2006 | Poon et al. | |
| 2006/0088191 A1 | 4/2006 | Zhang et al. | |
| 2007/0014368 A1 | 1/2007 | MacInnis et al. | |
| 2007/0116119 A1* | 5/2007 | Wang | 375/240.12 |
| 2008/0043133 A1* | 2/2008 | Sasaki et al. | 348/341 |
| 2008/0225125 A1 | 9/2008 | Silverstein et al. | |
| 2008/0226184 A1 | 9/2008 | Silverstein et al. | |
| 2008/0226192 A1 | 9/2008 | Silverstein et al. | |
| 2008/0260265 A1* | 10/2008 | Silverstein et al. | 382/232 |
| 2008/0307186 A1* | 12/2008 | Silverstein | 711/170 |
| 2009/0041363 A1* | 2/2009 | Choi | 382/233 |

FOREIGN PATENT DOCUMENTS

| | | |
|---|---|---|
| EP | 1024456 A2 | 8/2000 |
| EP | 1480170 A1 | 11/2004 |
| GB | 2418090 A1 | 3/2006 |
| WO | WO-9941912 A2 | 8/1999 |
| WO | WO-2006070046 A1 | 7/2006 |
| WO | WO-2008/112315 A3 | 9/2008 |
| WO | WO-2008112315 A2 | 9/2008 |
| WO | WO-2008/133898 A1 | 11/2008 |

OTHER PUBLICATIONS

Ye, G., et al., "Efficient multi-image registration with illumination and lens distortion correction", *IEEE International Conference on Image Processing, 2005. ICIP 2005*, vol. 3, (2005),III-1108-11.

Zhu, CE, et al., "An Enhanced Hexagonal Search Algorithm for Block Motion Estimation", *ISCAS '03. Proceedings of the 2003 International Symposium*, vol. 2, (May 25-28, 2003),II-392-II-395.

"International Application Serial No. PCT/US2008/003461, International Search Report mailed Nov. 17, 2008", 6 pages.

"International Application Serial No. PCT/US2008/003461, Written Opinion mailed Nov. 17, 2008", 14 pages.

Brailean, J. C, et al., "Noise reduction filters for dynamic image sequences : A Review", *Proceedings of the IEEE*, New York, US, (1995), 1272-1291.

Cheng-Hsien, L., et al., "Ultrasound image compounding based on motion compensation", *Engineering in medicine and biology society*, (2005), 6445-6448.

Song, B. C, et al., "Motion compensated temporal filtering for denoising in video encoder", *Electronics letters, Iee Stevenage*, GB, vol. 40(13), (2004), 802-804.

Zlokolica, V., et al., "Recursive temporal denoising and motion estimation of video", *Image processing, ICIP*, vol. 3, (2004), 1465-1468.

\* cited by examiner

COMPRESSED DOMAIN IMAGE SUMMATION APPARATUS, SYSTEMS, AND METHODS

TECHNICAL FIELD

Various embodiments described herein relate to apparatus, systems, and methods associated with imaging, including image summation techniques for increased integration efficiency.

BACKGROUND INFORMATION

As megapixel counts grow and pixel dimensions shrink in the field of digital imaging, longer image integration times may be required for a given brightness of scene lighting. However, if an exposure is too long, camera motion may result in a blurred image.

A camera or other image capture device may meter available light and may increase its lens aperture diameter to permit more of the available light to impinge on the image sensor. However, in low light conditions the camera may reach the wide extreme of the available aperture adjustment range. In this case, setting an exposure time sufficient to capture enough light may result in a blurred image. Conversely, setting an exposure time sufficiently short to avoid blur may result in a dark image. Increasing image sensor amplification to lighten the image may introduce an unacceptable level of pixel noise.

Thus, a need exists to decrease blur during long exposures.

DETAILED DESCRIPTION

Figure 1:
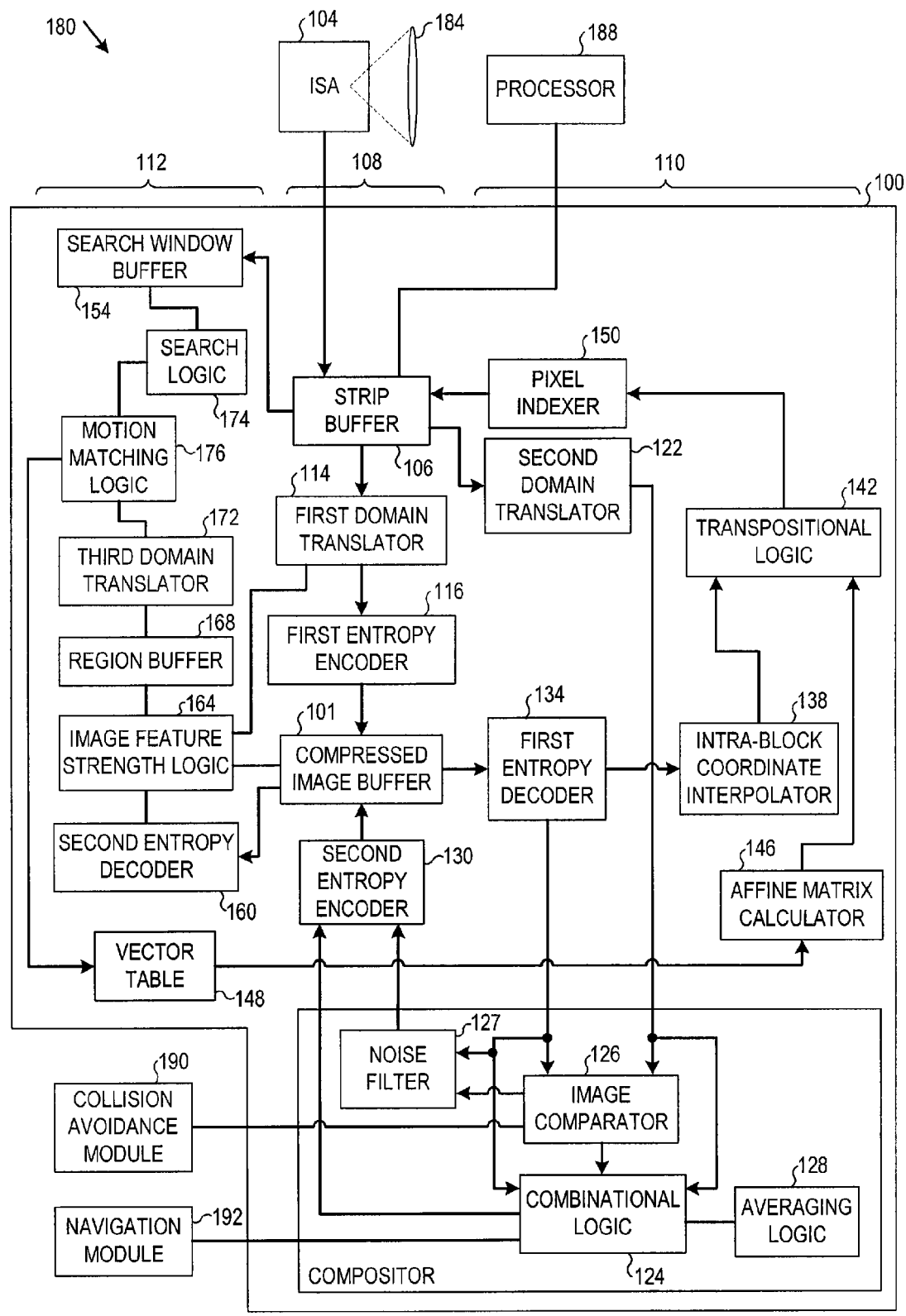
FIG. 1 is a block diagram of an apparatus and a system according to various embodiments of the invention.

FIG. 1 is a block diagram of an apparatus 100 and a system 180 according to various embodiments of the current invention. The apparatus 100 may be associated with an image capture device. For conciseness and clarity, some embodiments may be described herein in the context of a digital camera. However, it is noted that various embodiments may be realized in other image capture device-based apparatus, systems, and applications, including cellular telephones, hand-held computers, laptop computers, desktop computers, automobiles, household appliances, medical equipment, point-of-sale equipment, and image recognition equipment, among others.

The apparatus 100 increases the effective light sensitivity of the associated image capture device without an appreciable increase in pixel noise levels by performing a compositing operation in the frequency domain (FD) on a sequence of image frames captured in succession. Each successive image is transposed in the spatial domain according to relative movement between the image capture device and the scene being captured to provide for image alignment notwithstanding the movement. For the embodiments described herein, "transposition" or "transposition operation" means to change, modify, or adjust Cartesian coordinates of one or more pixels relative to a photographic frame such that the pixels are moved to a different position in the frame.

It is noted that an image may be stored in a compressed format in an image buffer. Various compressed formats may be used, including a joint photographic experts group (JPEG) format. Some compressed image formats contemplated herein, including the JPEG format, achieve compression by performing an entropy encoding operation on a version of the image that has been transformed to the frequency domain. Some embodiments herein perform an entropy decoding operation on the compressed image to yield a version of the image in the frequency domain (e.g., to yield a discrete cosine transform (DCT) version of the image).

Example images and image components are referred to hereinafter according to a temporal order of receiving the image from an image sensor array (ISA) or storing the image in a compressed image buffer 101. Thus, for example, a "new," "newly-received," or "subsequently received" version of an image is received after an "earlier-stored" or "previously received" version of the image.

Example images and image components may also be referred to according to whether the image comprises pixel image blocks from a single ISA read-out operation or from more than one ISA read-out operation. Thus, an "earlier-stored composite" version of the image may comprise an earlier-stored version of the image, including pixel image blocks from one or more ISA read-out operations composited together. A "new composite image" may comprise an earlier-stored composite image composited together with a newly-received version of the image. The term "version of the image" in this context relates to the sequence of image frames of the scene captured in succession, and recognizes that relative camera-to-scene movement may, and generally will, result in a different pixel image array in each frame.

Figure 2A:
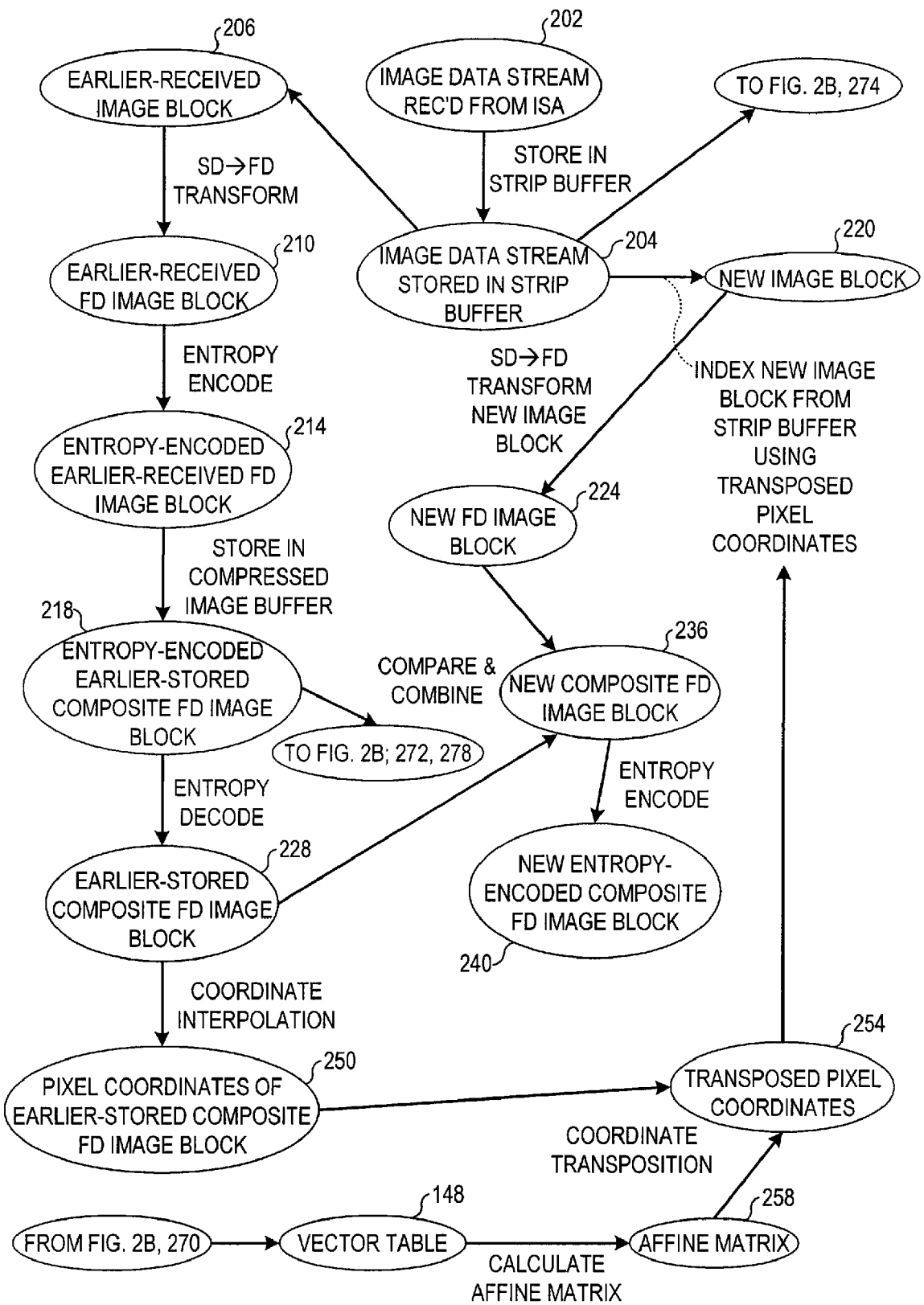
FIGS. 2A and 2B are object-state diagrams according to various embodiments of the invention.
Figure 2B:
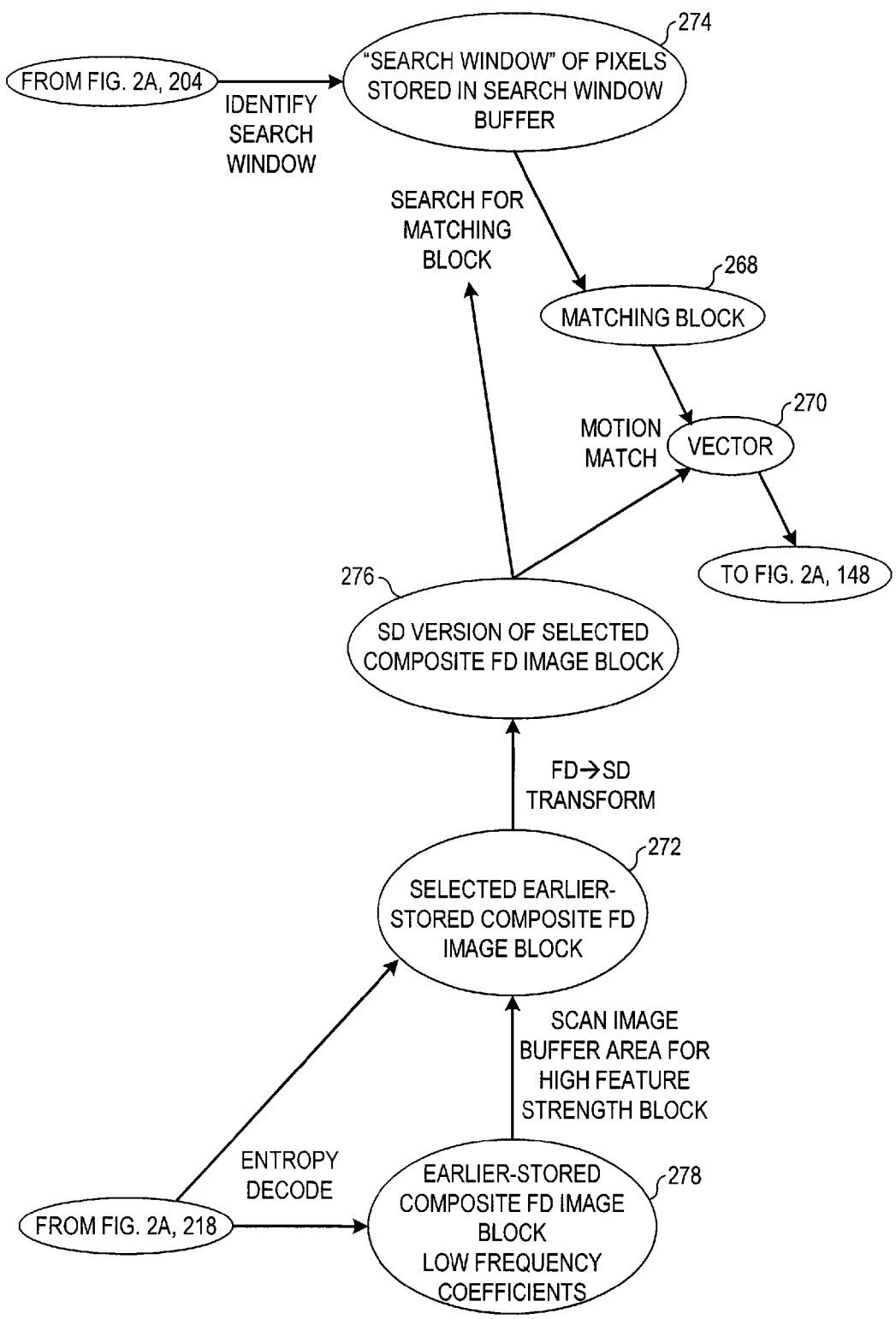

FIGS. 2A and 2B are object-state diagrams according to various embodiments of the current invention. The FIGS. 2A and 2B depict image components resulting from operations performed by the apparatus 100 on image data received from an ISA 104.

Referring now to FIGS. 1, 2A, and 2B, some embodiments of the apparatus 100 may include a strip buffer 106. The strip buffer 106 temporarily stores portions of image data streams associated with the sequence of images of the scene. A portion of an image data stream 202 may be stored as it is received from the ISA 104 as a stored image data stream 204. One or more image blocks may be selected from the strip buffer 106 and operated on by various components of the apparatus 100. Some embodiments may operate on eight pixel by eight pixel image blocks; however other block sizes are possible.

The apparatus 100 may be roughly divided into three functional sections, each described in detail further below. A section 108 of the apparatus 100 selects image blocks associated with a first-received image from the strip buffer 106 in order to populate the compressed image buffer 101 with the first-received image. A section 110 selects image blocks associated with a successive image from the strip buffer 106, converts the blocks to the frequency domain, and adds the converted blocks to the compressed image buffer 101. A section 112 selects a "search window" of image blocks from the strip buffer 106 to use in motion-matching operations.

The apparatus 100 may thus include a first domain translator 114 coupled to the strip buffer 106. The first domain translator 114 operates to convert an earlier-received image block 206 associated with a first-received image from the spatial domain (SD) to the frequency domain to yield an earlier-received FD image block 210. A first entropy encoder 116 may be coupled to the first domain translator 114. The first entropy encoder 116 operates to entropy-encode the earlier-received FD image block 210 to yield an entropy-encoded earlier-received FD image block 214.

The entropy-encoded earlier-received FD image block 214 is stored in the compressed image buffer 101 as an entropy-encoded earlier-stored composite FD image block 218. The denomination "composite FD image block" in this instance signifies that blocks associated with the version of the image stored in the compressed image buffer are generally composited from the first data stream associated with the first of the sequence of images and from subsequently-received data streams associated with images received subsequent to the first image. The first domain translator 114 and the first entropy encoder 116 thus operate to populate the compressed image buffer 101 with the first image of the sequence. A pre-sequence image may be received and domain-converted but not stored, as described further below.

The apparatus 100 may also include a second domain translator 122 coupled to the strip buffer 106. The second domain translator 122 operates on a new image block 220 of pixel illuminance values selected from the stored image data stream 204 to convert the block 220 from the spatial domain to the frequency domain via an SD to FD transform operation. The transform operation yields a new FD image block 224.

The apparatus 100 may further include combinational logic 124 operationally coupled to the second domain translator 122. The combinational logic 124 combines the new FD image block 224 with a corresponding earlier-stored composite FD image block 228 to yield a new composite FD image block 236, as described in detail further below. The earlier-stored composite FD image block 228 may be associated with one or more previously received versions of the image.

If the new FD image block 224 corresponds to the second image of the sequence of images, the earlier-stored composite FD image block 228 is associated with only the first-received image of the sequence of images. On the other hand, if the new FD image block 224 corresponds to the third or a subsequent image of the sequence of images, the earlier-stored composite FD image block 228 may comprise portions of two or more earlier-stored images.

Some embodiments may include an image comparator 126 coupled to the second domain translator 122. The image comparator 126 operates to compare a selected set of low-frequency coefficients of the new FD image block 224 to a corresponding set of low-frequency coefficients of the corresponding earlier-stored composite FD image block 228. Low-frequency coefficients of an image block in the frequency domain may correspond to image features. Conversely, high-frequency coefficients may correspond to noise. The image comparator 126 may thus compare significant features of the new FD image block 224 to significant features of the corresponding earlier-stored composite FD image block 228. The compare operation may be performed as a verification that the two FD image blocks 224 and 228 indeed match within a match threshold.

If the compare operation does not yield a match within the match threshold, some embodiments may discard the new FD image block 224. In that case, a noise filter 127 may be coupled to the image comparator 126. The noise filter 127 operates by attenuating high-frequency coefficients of the earlier-stored composite FD image block 228. Other noise filter implementations are possible. The filtering operation yields a new composite FD image block 236 comprising a smoothed version of the earlier-stored composite FD image block 228.

The apparatus 100 may also include averaging logic 128 coupled to the combinational logic 124. The averaging logic 128 determines how the new FD image block 224 is combined with the corresponding earlier-stored composite FD image block 228.

The averaging logic 128 computes a weighted average of FD coefficients of the new FD image block 224 and corresponding FD coefficients of the earlier-stored composite FD image block 228. For example, in some embodiments a weight associated with the FD coefficients of the new FD image block 224 may be set to a value of one. A weight associated with the corresponding FD coefficients of the earlier-stored composite FD image block 228 may comprise a number equal to a number of image frames composited into the earlier-stored composite FD image block 228. Other embodiments may use other mathematical schemes to combine FD coefficients from the new FD image block 224 with corresponding FD coefficients from the earlier-stored composite FD image block 228.

A second entropy encoder 130 may be coupled to the combinational logic 124. The second entropy encoder 130 may entropy-encode the new composite FD image block 236 to yield an entropy-encoded new composite FD image block 240. The entropy-encoded new composite FD image block 240 may then be stored in the compressed image buffer 101.

It was previously mentioned that in some embodiments the image comparator 126 verifies that the new FD image block 224, transformed to the frequency domain from the strip buffer 106, matches the corresponding earlier-stored composite FD image block 228 within a match threshold. Some embodiments herein may perform affine transform operations on the earlier-stored composite FD image block 228. A resulting set of coordinates is used to index a spatial domain version of the new FD image block 224 from the strip buffer 106. The spatial domain version of the new FD image block 224 is transformed to the frequency domain by the second domain translator 122 for combination with the earlier-stored composite FD image block 228, as previously described.

The apparatus 100 may thus include a first entropy decoder 134 coupled to the image comparator 126. The first entropy decoder 134 performs an entropy decoding operation on the entropy-encoded earlier-stored composite FD image block 218 to yield the earlier-stored composite FD image block 228.

Figure 3:
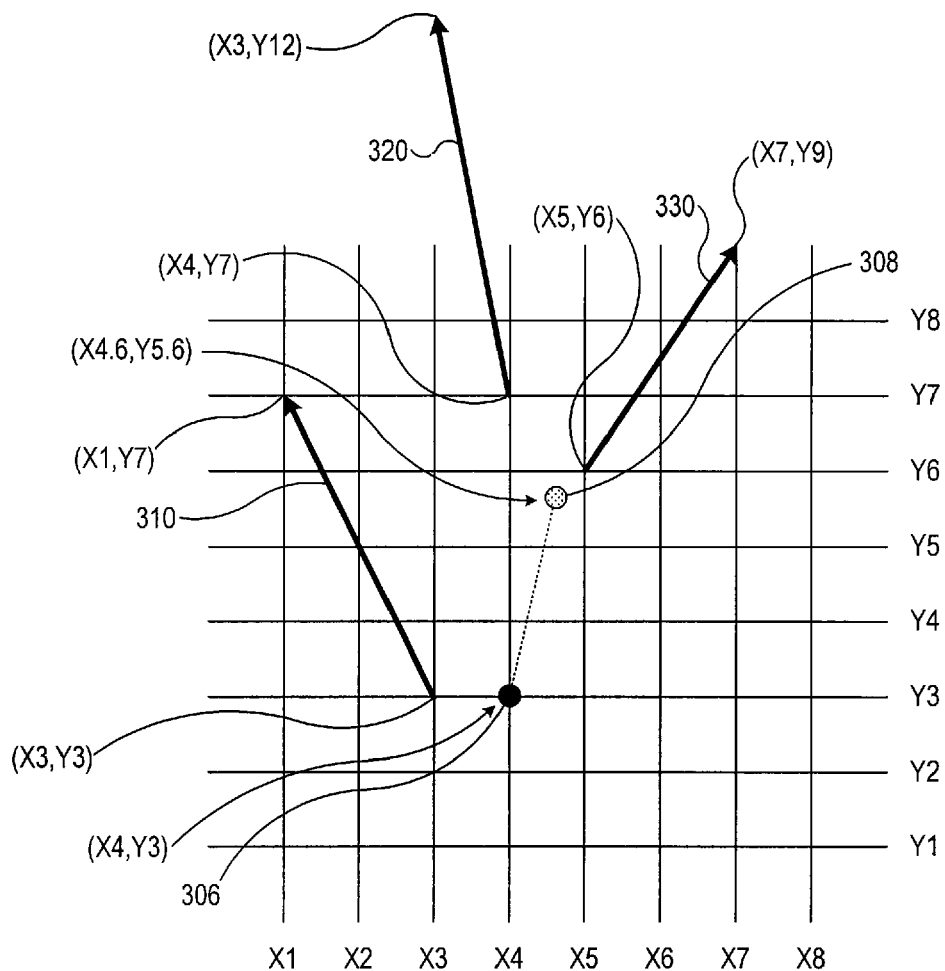
FIG. 3 is a vector diagram according to various embodiments of the invention.

FIG. 3 is a vector diagram according to various embodiments of the current invention. Referring now to FIGS. 1-3, an intra-block coordinate interpolator 138 may be coupled to the first entropy decoder 134. The intra-block coordinate interpolator 138 reads a set of block positional coordinates associated with the earlier-stored composite FD image block 228. From the set of block positional coordinates, the intra-block coordinate interpolator 138 determines a set of coordinates 250 (e.g., the coordinates (X4,Y3) of FIG. 3) associated with a pixel (e.g., the pixel 306) within the earlier-stored composite FD image block 228. Each coordinate of the set of coordinates 250 may be calculated as an offset from a corresponding block positional coordinate.

Transpositional logic 142 may be operatively coupled to the first entropy decoder 134. The transpositional logic 142 performs a spatial transposition operation on the pair of coordinates 250 associated with the pixel 306 within the earlier-stored composite FD image block 228. The spatial transposition may comprise an affine matrix multiplication operation, and may yield a transposed set of coordinates 254 (e.g., the coordinates (X4.6,Y5.6)).

The transposed set of coordinates 254 may be associated with a pixel 308 from the new version of the image. The transposed set of coordinates 254 are used to locate the pixel 308 within the new image data stream 204 in the strip buffer 106. Having located the pixel 308 and having spatially associated the pixels 306 and 308, the apparatus 100 uses the combinational logic 124 to combine FD coefficients from FD image blocks associated with the pixels 306 and 308. The combinational logic 124 may combine the FD coefficients from each of the blocks to generate a corresponding new composite FD image block 236, as previously described. It is noted that some embodiments may assemble entire blocks of transposed pixels and combine the corresponding FD image data blocks to form the new composite FD image. Some embodiments may operate on other increments of FD image data.

An affine matrix calculator 146 may be coupled to the transpositional logic 142 to provide an affine matrix 258 for the above-described transposition operation. The affine matrix calculator 146 may generate the affine matrix 258 such that a set of coordinates (e.g., the coordinates (X3,Y3), (X4, Y7), and (X5,Y6)) of a set of starting points associated with one or more vectors 310, 320, and 330 multiplied by the affine matrix 258 results in a set of coordinates (e.g., the coordinates (X1,Y7), (X3,Y12), and (X7,Y9) respectively), of a set of ending points associated with the vectors 310, 320, and 330.

Figure 4:
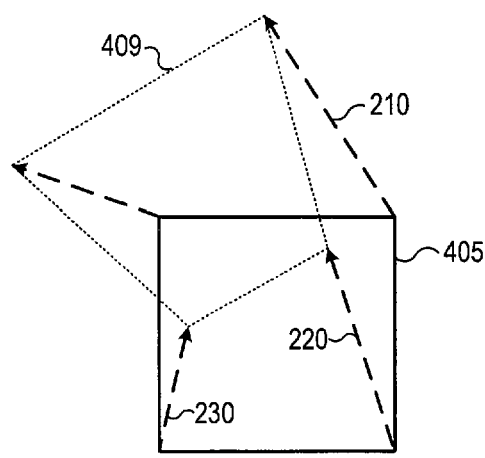
FIG. 4 is a pixel block diagram according to various embodiments of the invention.

FIG. 4 is a pixel block diagram according to various embodiments of the current invention. FIG. 4 depicts a spatial domain version 405 of an earlier-stored composite FD image pixel block (e.g., the block 228). Referring now to FIGS. 1-4, the vectors 310, 320, and 330 represent paths between pixels from the image block 405 associated with the previously received versions of the image and corresponding pixels from a spatial domain version 409 of a new FD image block (e.g., the block 224). The pixel positions are measured relative to a frame that is common to the previously received versions of the image and to the new version of the image. Similar vectors from previously-received blocks are used as inputs to the affine matrix generation operation and may be selected from a vector table 148. Population of the vector table 148 results from motion matching operations discussed in detail further below.

Relative camera-to-scene motion, including camera motion and/or motion of elements within the scene, may coordinate-shift pixels from the newly-received image block 409 such that the block 409 is positionally shifted, skewed, rotated, vertically stretched, and/or horizontally stretched with respect to the earlier-stored composite image pixel block 405. Some embodiments herein operate to locate pixel luminance values associated with the newly-received image block 409 within the coordinate-shifted data stream. FD coefficients associated with the pixel illuminance values may then be combined with the earlier-stored composite image pixel block 405 in the frequency domain. The mathematical combination is stored as the new composite FD image block 236.

A pixel indexer 150 may be coupled to the transpositional logic 142. The pixel indexer 150 uses the set of transposed pixel coordinates 254 that are output from the transpositional logic 142 to index pixel luminance values associated with the newly-received image block 409 from the strip buffer 106. The second domain translator 122 converts the newly-received image block 409 to the frequency domain in the case of embodiments that perform the mathematical combination operation in the frequency domain.

Figure 5:
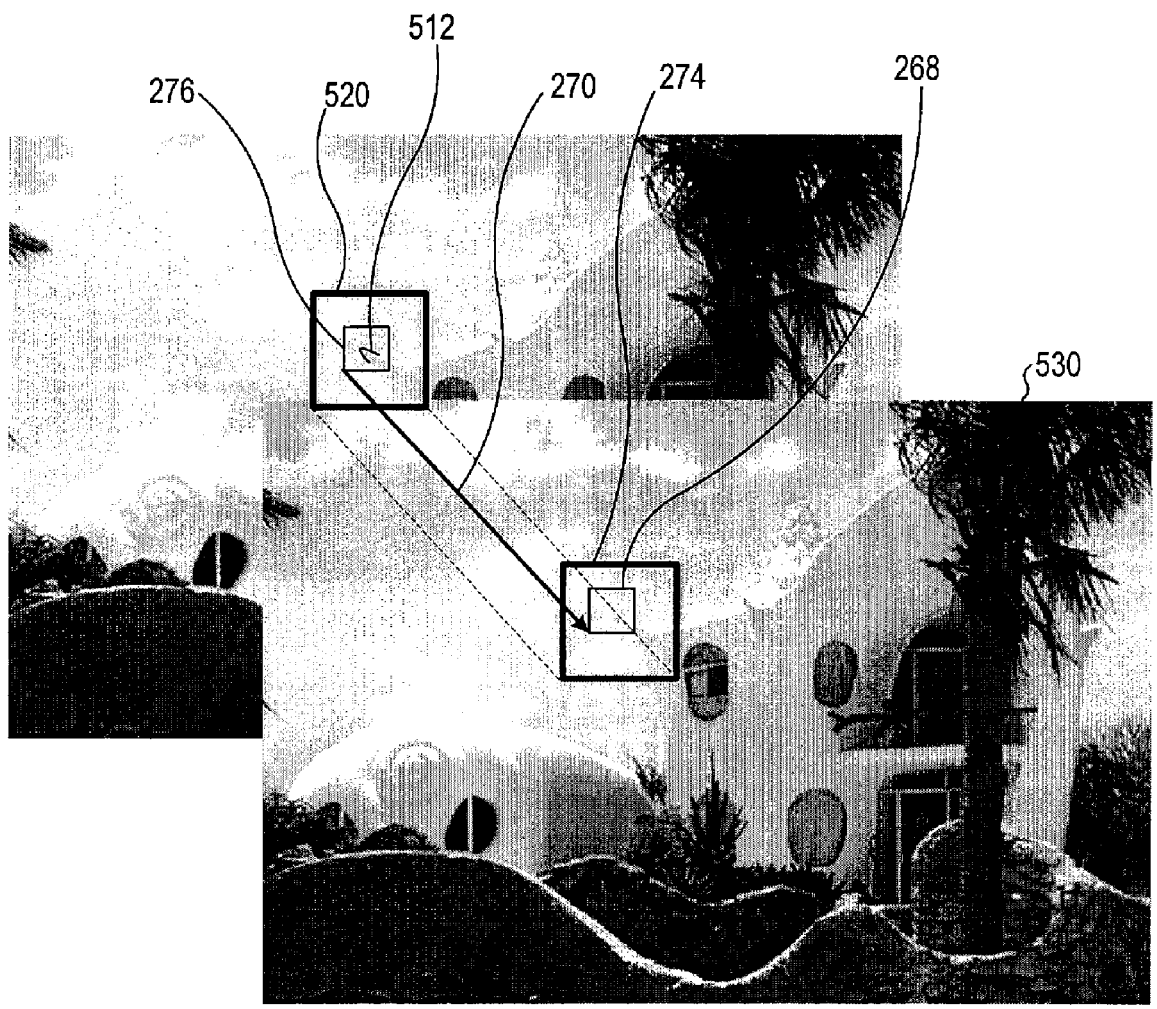
FIG. 5 is a motion matching diagram according to various embodiments of the invention.
Figure 6A:
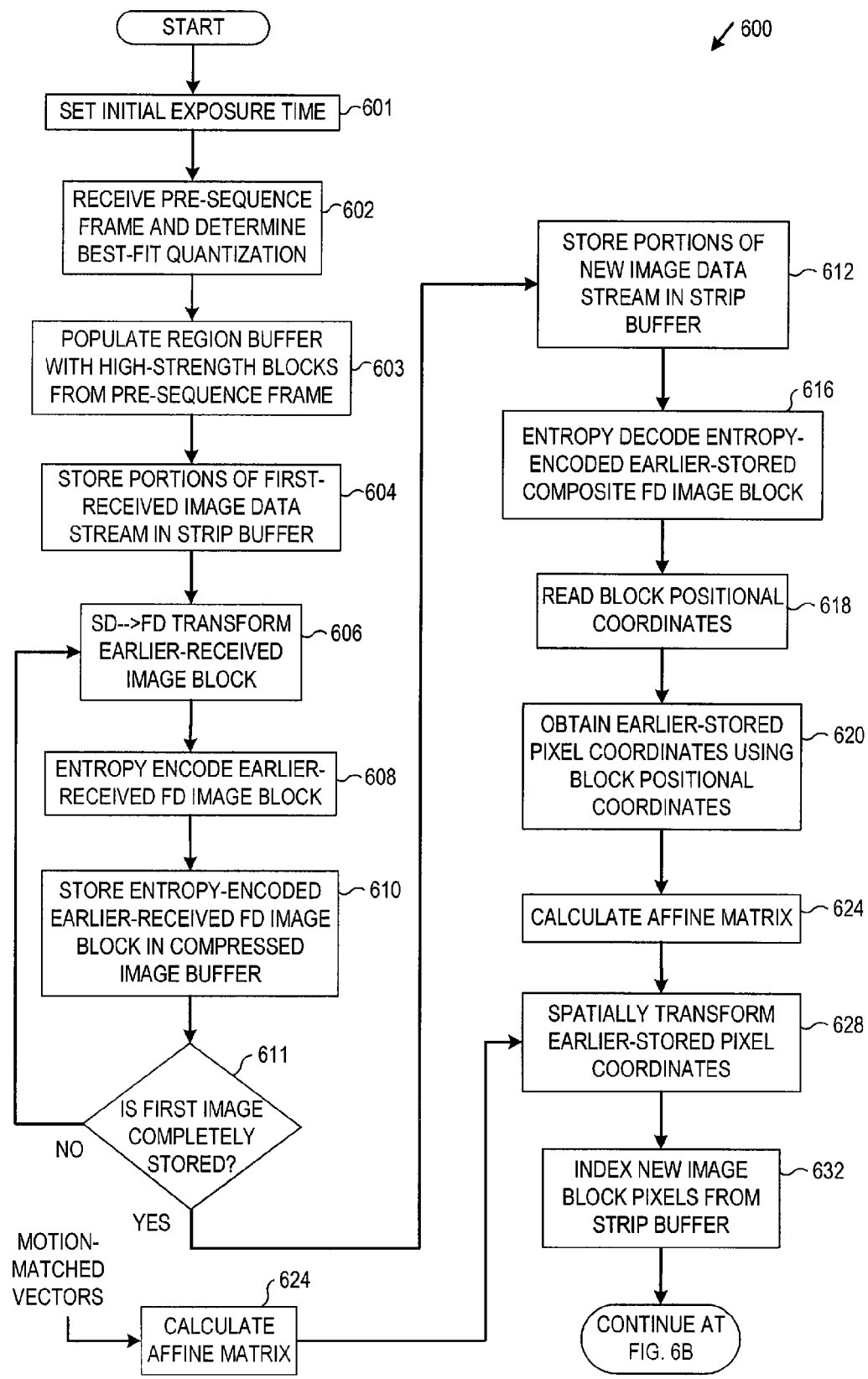
FIGS. 6A-6D are flow diagrams according to various embodiments of the invention.
Figure 6B:
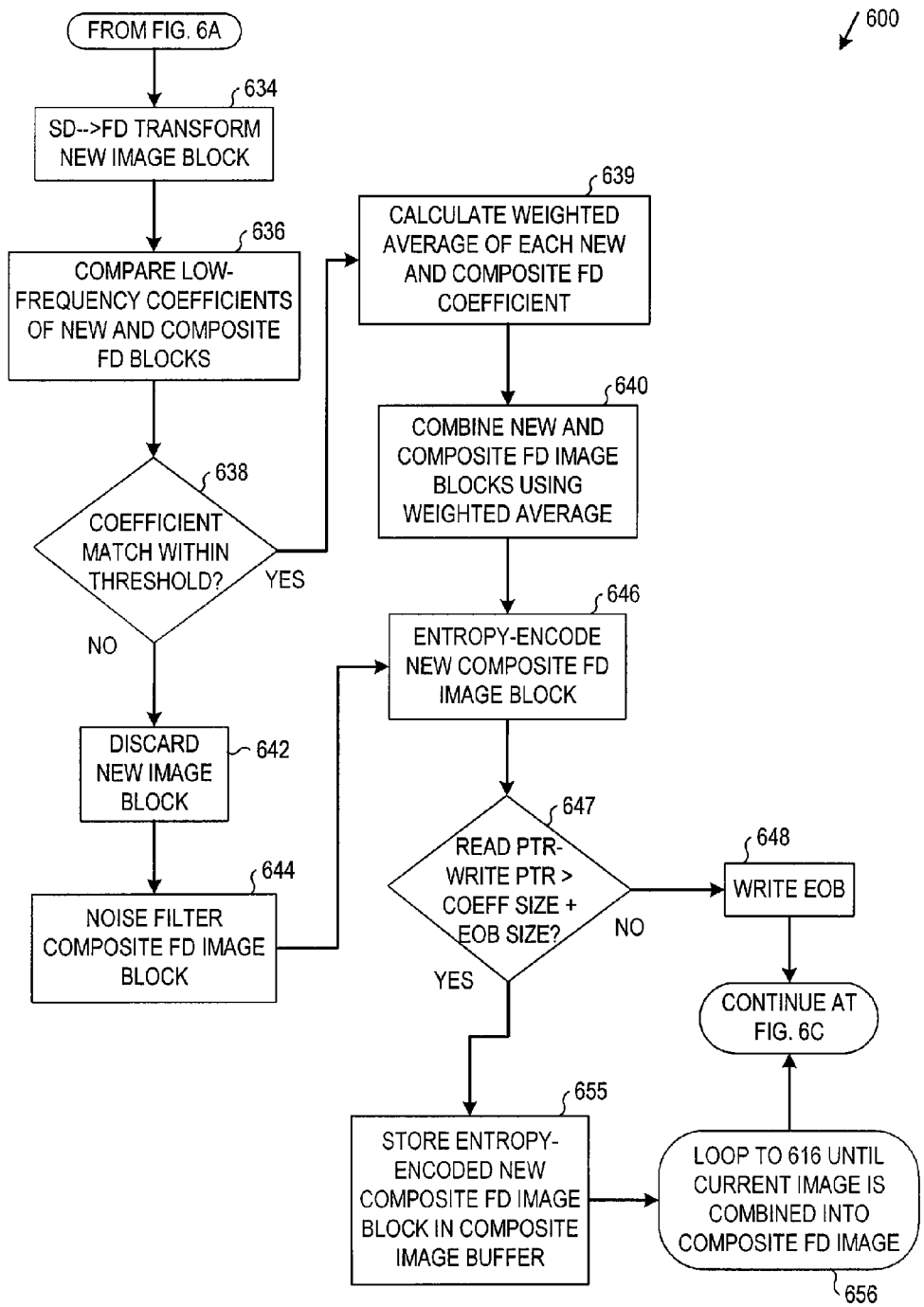
Figure 6C:
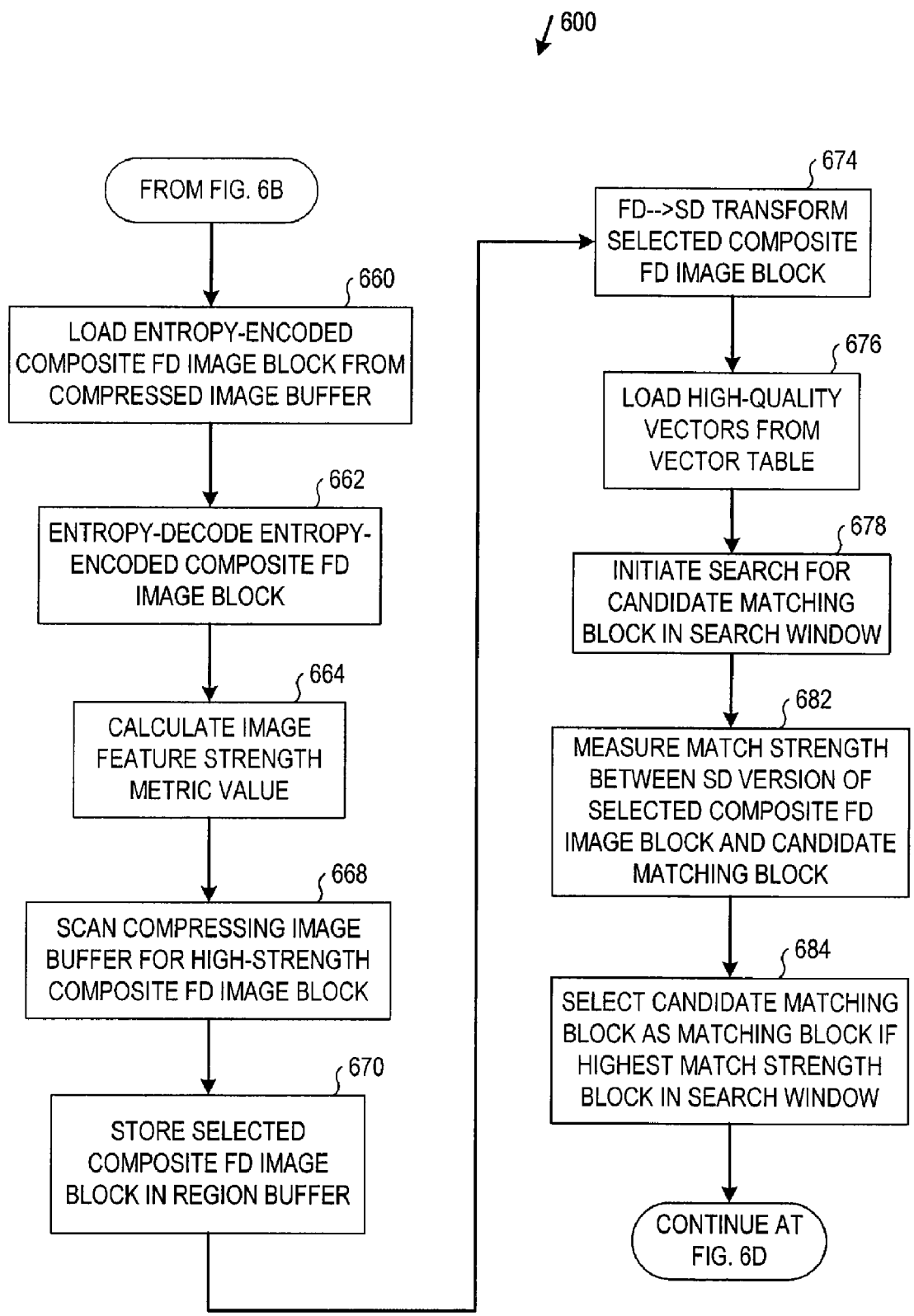
Figure 6D:
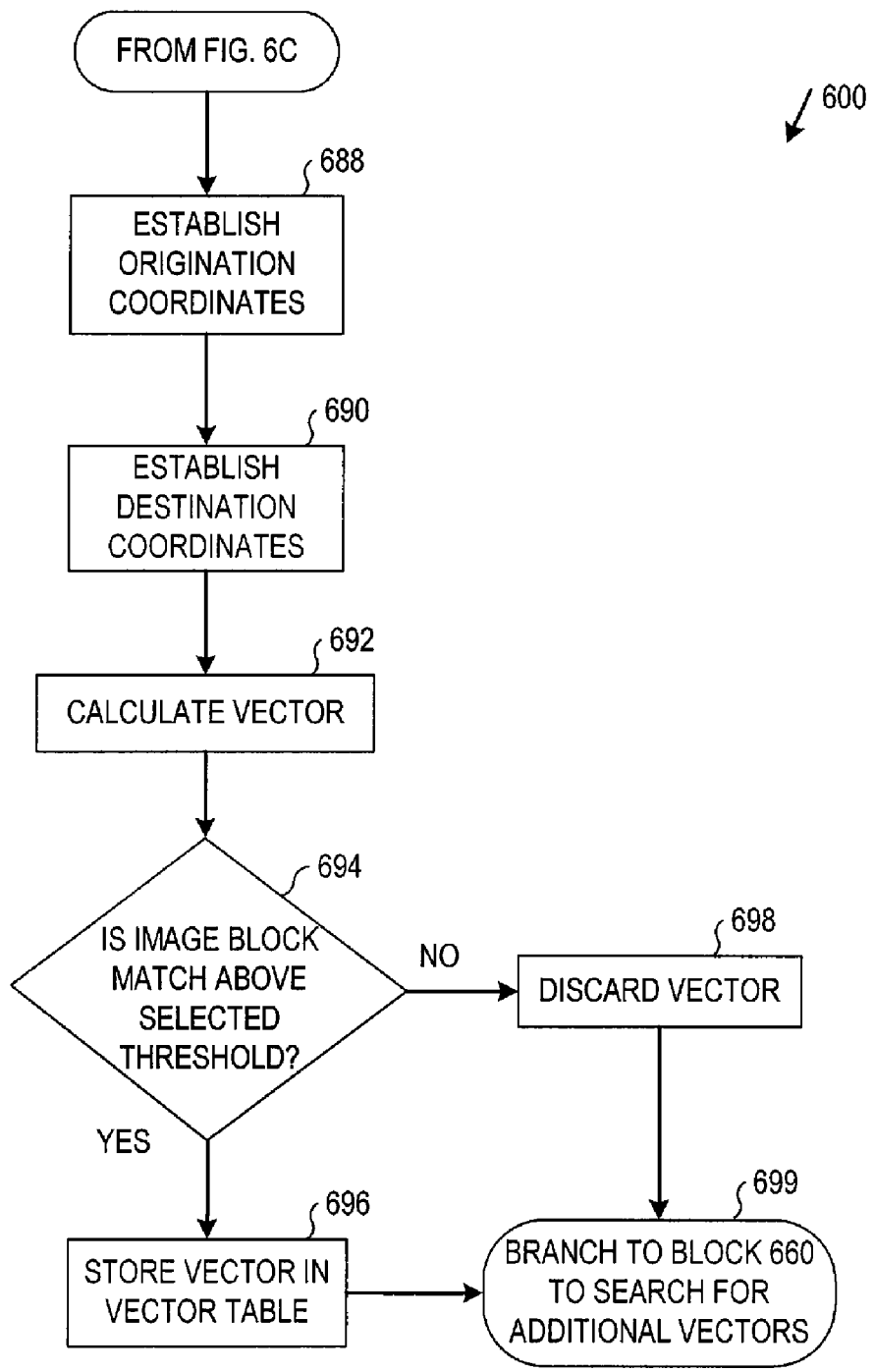

FIG. 5 is a motion matching diagram according to various embodiments of the current invention. Referring now to FIGS. 1, 2A, 2B, and 5, the apparatus 100 may perform motion matching operations on a spatial domain version of the earlier-stored composite FD image block 228 and a matching image block 268 of a newly-received image data stream stored in the strip buffer 106. The motion matching operations are used to calculate a vector 270 with which to populate the vector table 148.

Some embodiments may find, entropy-decode, and load a high feature strength earlier-stored composite FD image block 272 from the compressed image buffer 101. The high feature strength earlier-stored composite FD image block 272 may comprise an earlier-stored composite FD image block with a highest feature strength of all image feature blocks associated with a selected region of the earlier-stored composite FD image. Examples hereinunder expressed in terms of a "high" or "highest" feature strength image block may also apply to embodiments that do not use feature strength to select a block from the stored image buffer for matching. Likewise, examples expressed hereinunder without the use of the terms "high" or "highest" may also apply to embodiments that do select blocks for motion matching based upon feature strength.

"High feature strength" as used herein means a measure of one or more characteristics associated with an image feature 512 that render the image feature 512 distinguishable from other image features and from the set of background pixels. Thus for example, a low image feature strength may be associated with a line segment standing alone in a sample pixel block. Such line segment may be ambiguous and difficult to distinguish from other line segments associated with the same line. On the other hand, a high image feature strength may be associated with a junction of crossing lines in a sample pixel block. In the latter case, line crossing angles may serve to distinguish a particular junction of crossing lines from other such junctions. Measures of image feature strength may include mathematical operations performed on selected sets of low-frequency FD coefficients, as described further below. These measures may be used to distinguish pixel image blocks and to find blocks that are similar.

The apparatus 100 may search for the matching image block 268 using a search window buffer 154 coupled to the strip buffer 106. The search window buffer 154 stores a set of pixels from the strip buffer 106 referred to herein as the search window 274. The search window 274 may comprise a 64×64 pixel block in some embodiments, and may correspond to an area 520 of an SD version of the compressed FD image stored in the compressed image buffer 101. That is, the search window 274 comprises an area of a newly-received image 530 within which the matching image block 268 may be expected to be found, considering expected relative scene-to-camera motion. In some embodiments, for example, the search window 274 may be centered at a coordinate position corresponding to the center of an SD version 276 of the high feature strength earlier-stored composite FD image block 272.

The apparatus 100 may include a second entropy decoder 160 coupled to the compressed image buffer 101. The second entropy decoder 160 loads the entropy-encoded earlier-stored composite FD image block 218 from the compressed image buffer 101. The second entropy decoder 160 performs a full or partial entropy decoding operation on the entropy-encoded earlier-stored composite FD image block 218 to reveal a set of low-frequency coefficients 278. Some embodiments may limit decoding to a high-order portion of the entropy-encoded image block 218, wherein the set of low-frequency coefficients 278 may be located. "High-order portion" refers to a selected number of bits located at bit positions associated with low-frequency coefficients in the block data stream. A partial decode may be sufficient to reveal image feature strength as described here below.

The apparatus 100 may include image feature strength logic 164 coupled to the second entropy decoder 160. The image feature strength logic 164 operates to scan a selected area of the compressed image buffer 101 for a highest strength earlier-stored composite FD image block (e.g., the high feature strength earlier-stored composite FD image block 272). That is, the image feature strength logic 164 chooses a block with an image feature strength higher than any other image block from the selected area, based upon an image feature strength metric. The image feature strength metric may comprise a mathematical operation performed on the set of low-frequency coefficients 278 from an earlier-stored composite FD image block, or other operation calculated to measure image feature strength. For example, the mathematical operation may comprise a sum of the absolute values of the set of low-frequency coefficients 278 in some embodiments.

The apparatus 100 may also include a region buffer 168 coupled to the image feature strength logic 164. The region buffer 168 stores the high feature strength earlier-stored composite FD image block 272. Some embodiments may receive a pre-sequence image frame at the strip buffer 106 prior to receiving the first-received image frame. If utilized, the pre-sequence image frame may be converted to the frequency domain block-by-block by the first domain translator 114 as described above. Each block may be analyzed for image feature strength; and highest-strength blocks may be stored in the region buffer 168. The pre-sequence image frame may thus serve to pre-populate the region buffer 168 with high-strength blocks. Thus populated, the region buffer 168 is ready to be used in motion-matching operations associated with the first-received image frame. The resulting motion vectors may be used as predictors for motion-matching operations performed on subsequent frames.

The pre-sequence image frame may also be analyzed to determine a quantization table adequate to size the received image to the compressed image buffer 101. The pre-sequence image frame may be quantized and entropy-encoded using alternative quantization tables to find a compatible compression ratio. Subsequent images in the sequence of images may then be expeditiously encoded using the quantization table determined from the pre-sequence image frame.

A third domain translator 172 may be coupled to the region buffer 168. The third domain translator 172 performs an FD to SD transform operation on the high feature strength earlier-stored composite FD image block 272 to obtain the SD version 276 of the high feature strength earlier-stored composite FD image block 272. The FD to SD transform operation may comprise an inverse discrete cosine transform (DCT) operation in some embodiments. Other embodiments may use other FD to SD transform types.

The apparatus 100 may further include search logic 174 coupled to the search window buffer 154. The search logic 174 searches the search window 274 for the matching image block 268. The search logic 174 may recognize that the matching image block 268 has been found if a strength of a match between the SD version 276 of the high feature strength earlier-stored composite FD image block 272 and a candidate matching image block is greater than a strength of a match between the SD version 276 of the image block 272 and any other block found in the search window 274.

The apparatus 100 may also include motion matching logic 176 operatively coupled to the strip buffer 106. The motion matching logic 176 calculates the vector 270 between a position in a frame of the SD version 276 of the image block 272 and a position in the frame of the matching image block 268. The motion matching logic 176 also stores the vector 270 in the vector table 148 if the strength of the match between the SD version 276 of the image block 272 and the matching image block 268 is above a selected match threshold.

In another embodiment, a system 180 may include one or more of the apparatus 100, including a strip buffer 106, combinational logic 124, and an image comparator 126, as previously described. The system 180 may also include an ISA 104 coupled to the strip buffer to capture an image and a lens 184 to focus the image on the ISA 104. The system 180 may further include a processor 188 operationally coupled to the strip buffer 106 to perform image processing functions. Some embodiments of the system 180 may be incorporated into a digital camera. A digital camera comprising the system 180 may in turn be incorporated into consumer electronic devices such as cell phones, as previously mentioned.

Some embodiments of the system 180 may be used in vehicular applications. A collision avoidance module 190 may be operationally coupled to the image comparator 126. The collision avoidance module 190 may be configured to trigger a collision avoidance alert if a selected set of low-frequency coefficients of the new FD image block 224 do not match a corresponding set of low-frequency coefficients of the corresponding earlier-stored composite FD image block 228 within a second match threshold.

The system 180 may also include a navigation module 192 coupled to the combinational logic 124. The navigation module 192 may be configured to update a stored-image database with a new composite FD image block 236 created by the combinational logic 124. In some embodiments, the navigational module 192 may update a stored map of surrounding scenery as a vehicle repeatedly traverses a particular route over time.

Any of the components previously described may be implemented in a number of ways, including embodiments in software. Software embodiments may be used in a simulation system, and the output of such a system may drive the various apparatus described herein.

Thus, the apparatus 100; the ISA 104; the strip buffer 106; the image data streams 202, 204; the domain translators 114, 122, 172; the image blocks 206, 210, 214, 218, 220, 224, 228, 236, 240, 405, 409, 268, 272, 276; the entropy encoders 116, 130; the image buffer 101; the combinational logic 124; the image comparator 126; the noise filter 127; the averaging logic 128; the entropy decoders 134, 160; the coordinate interpolator 138; the coordinates 250, 254; the pixels 306, 308; the transpositional logic 142; the affine matrix calculator 146; the affine matrix 258; the vectors 310, 320, 330, 270; the vector table 148; the pixel indexer 150; the image feature 512; the search window buffer 154; the search window 274; the area 520; the image 530; the low-frequency coefficients 278; the image feature strength logic 164; the region buffer 168; the search logic 174; the motion matching logic 176; the system 180; the lens 184; the processor 188; the collision avoidance module 190; and the navigation module 192 may all be characterized as "modules" herein.

The modules may include hardware circuitry, optical components, single or multi-processor circuits, memory circuits, software program modules and objects, firmware, and combinations thereof, as desired by the architect of the apparatus 100 and the system 180 and as appropriate for particular implementations of various embodiments.

The apparatus and systems of various embodiments may be useful in applications other than performing a compositing operation in the frequency domain on a sequence of image frames captured in succession to decrease noise while maintaining the effective light sensitivity of the image capture device. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

FIGS. 6A, 6B, 6C, and 6D are flow diagrams illustrating several methods according to various embodiments. A method 600 combines FD coefficients from image blocks associated with a successive sequence of images to create a composite version of the images in the frequency domain. Some embodiments may operate on a block-by-block basis to combine a new FD image block associated with a later-received image with an earlier-stored composite FD image block to yield a new composite FD image block. The earlier-stored composite FD image block is associated with one or more previously-received image frames. The net effect is to reduce noise in the final composite image.

The method 600 may include storing sequential portions (e.g., one or more pixel rows) of an image data stream in a strip buffer as the portions are received from an ISA. One or more image blocks may be selected from the strip buffer and operated on according to various branches of the method 600. One branch may select image blocks associated with a first-received image from the strip buffer to populate a compressed image buffer with the first-received image. Another branch may convert image blocks associated with a successive image from the strip buffer and combine the converted blocks with composite blocks in a compressed image buffer. A third branch may select a "search window" of image blocks associated with a successive image from the strip buffer to use in motion-matching operations.

The method 600 may commence at activity 601 with setting an initial exposure time. Some embodiments may receive a pre-sequence image frame at the strip buffer prior to receiving the first-received image frame. The method 600 may thus continue at activity 602 with receiving the pre-sequence frame and determining a quantization table resulting in a best fit of the image frame compatible with the compressed image buffer size. The pre-sequence image frame may be quantized and entropy-encoded using alternative quantization tables to find a compatible fit. Subsequent images in the sequence of images may then be expeditiously encoded using the quantization table determined using the pre-sequence image frame, as previously described.

The method 600 may include pre-populating a region buffer with high feature-strength blocks from the pre-sequence image frame, at activity 603. The pre-sequence image frame may be analyzed for image feature strength; and highest-strength blocks may be stored in the region buffer. Thus populated, the region buffer is ready to be used in motion-matching operations associated with the first-received image frame.

The method 600 may also include storing sequential portions of a first-received image data stream in the strip buffer, at activity 604. The method 600 may continue at activity 606 with converting an earlier-received image block associated with the first-received image from the spatial domain to the frequency domain to yield an earlier-received FD image block. The method 600 may include entropy encoding the earlier-received FD image block to yield an entropy-encoded earlier-received FD image block, at activity 608.

The entropy-encoded earlier-received FD image block is stored in a compressed image buffer as an entropy-encoded earlier-stored composite FD image block, at activity 610. The entropy-encoded earlier-stored composite FD image block may comprise a JPEG image block or other frequency or phase domain formatted block. This process may continue until the first-received image is stored in the compressed image buffer, at activity 611.

Having populated the compressed image buffer with the first-received image, blocks from successive images may be combined into the compressed image buffer to form the composite image. However, because of relative camera-to-scene motion between the time of capturing a previous image and a next image, pixels from the next image corresponding to an image element may be, and generally will be, located at different coordinates in the strip buffer than coordinates of pixels corresponding to the same image element as stored in the compressed image buffer. Consequently, the method 600 may select pixels from the strip buffer for composition into a new image block in a different order than received into the strip buffer, as described here below.

The method 600 may continue at activity 612 with storing sequential portions of a newly-received image data stream in the strip buffer. The method 600 may also include performing an entropy decoding operation on an entropy-encoded earlier-stored composite FD image block, at activity 616. An earlier-stored composite FD image block may be obtained as a result. The entropy decoding operation may comprise a Huffman decoding operation or an arithmetic decoding operation, among others.

The method 600 may further include reading a set of block positional coordinates associated with the earlier-stored composite FD image block, at activity 618. A set of coordinates associated with one or more pixels within the earlier-stored composite FD image block may be obtained using the set of block positional coordinates, at activity 620. The set of pixel coordinates may be calculated as offsets from the set of block positional coordinates.

An affine matrix may be calculated using the method 600, at activity 624. The affine matrix is defined such that a set of coordinates of a set of starting points associated with one or more vectors multiplied by the affine matrix results in a set of ending points associated with the vectors. As implemented in some embodiments, each vector represents a path between a position in a frame of a previously-received image block and a corresponding position in the frame of a newly-received image block. Given the vectors, the affine matrix may be calculated using a Gaussian elimination operation according to techniques known to those skilled in the art. Derivation of the vectors used as inputs to the affine matrix calculator is described in detail further below.

The method 600 may include performing a spatial transposition operation on the set of pixel coordinates using the affine matrix, at activity 628. The spatial transposition may yield a set of coordinates associated with a set of pixels from the image data stream that are in approximate spatial alignment with pixels associated with a spatial domain version of the earlier-stored composite FD image block. The spatial transposition operation may include multiplying the set of coordinates associated with pixels from the earlier-stored composite FD image block by the affine matrix.

The newly-received image may contain pixels that were spatially transposed by relative camera-to-scene movement from positions that they occupied in previously-captured frames, as previously described. The movement may occur between the time of capturing the previous frames and capturing the newly-received frame. The affine spatial transformation effectively operates to bring the newly-received pixels into alignment with corresponding pixels from the earlier-stored composite FD image block. This is accomplished by spatially transposing pixel coordinates from the earlier-stored composite FD image block using the affine matrix to yield a set of "index" coordinates. The index coordinates are used to index spatially corresponding pixels from the newly-received image data stream to form the new image block, at activity 632.

The method 600 may also include converting the new image block from a spatial domain to a frequency domain using an SD to FD transform operation, at activity 634. Some embodiments may use a DCT operation to perform the SD to FD transform operation. Other SD to FD transforms, including Fourier transforms, are contemplated within the scope of the current disclosure.

The method 600 may also include comparing a selected set of low-frequency coefficients of the new FD image block to a corresponding set of low-frequency coefficients of the earlier-stored composite FD image block, at activity 636. Low-frequency coefficients of an FD image block may represent significant image features, as previously mentioned. The method 600 may determine whether the selected set of low-frequency coefficients of the new FD image block matches the corresponding set of low-frequency coefficients of the earlier-stored composite FD image block within a match threshold, at activity 638.

If so, the method 600 may further include calculating a weighted average of FD coefficients from the new FD image block and FD coefficients from the earlier-stored composite FD image block, at activity 639. Various weighting schemes may be used. For example, the weight associated with an FD coefficient $L_{NEW}$ of the new FD image block may comprise a value of one. The weight associated with a corresponding FD coefficient $L_{OLD}$ of the earlier-stored composite FD image block may comprise a number NF equal to a number of image frames composited into the earlier-stored composite FD image block. The weighted average of the resulting FD coefficient can be calculated as: $(L_{NEW}+NF*L_{OLD})/(NF+1)$.

The new FD image block may be combined with the earlier-stored composite FD image block using the weighted average, at activity 640.

If the low-frequency coefficients of the new FD image block do not match the low-frequency coefficients of the earlier-stored composite FD image block within the match threshold, the method 600 may include discarding the new FD image block, at activity 642. Thus, some embodiments may impose the condition of requiring a minimum match of significant image features between the new and earlier-stored composite FD image blocks. If the condition is not met, the method 600 may include using the earlier-stored composite FD image block as the new composite FD image block.

In the latter case, if the new FD image block is not composited with the earlier-stored composite FD image block, the new composite FD image block may include more noise than expected. This effect may be mitigated by noise filtering the earlier-stored composite FD image block to attenuate one or more high frequency coefficients, at activity 644. The noise filtering operation may reduce pixel noise that might have otherwise been averaged out by the new FD image block, had the new FD image block been composited rather than being discarded.

Assuming that the low-frequency coefficients of the new FD image block match the low-frequency coefficients of the earlier-stored composite FD image block within the match threshold, the new FD image block and the earlier-stored composite FD image block are combined into the new composite FD image block, as previously described. The method 600 may also include entropy-encoding the new composite FD image block to yield an entropy-encoded new composite FD image block, at activity 646.

The new composite FD image block may be stored in the composite image buffer if buffer space is sufficient to write the block without overwriting unprocessed image data. A read pointer is used by method 600 processes including activity 616 ("earlier processes"). To avoid overwriting the buffer at the read pointer and beyond if the write process proceeds faster than the read process, the method 600 may include determining whether the position of the read pointer less the position of the write pointer is greater than the new composite FD image block to be written plus space for end-of-block (EOB) information, at activity 647. If not, the method 600 may include writing the EOB information, at activity 648, and continuing at FIG. 6C.

If the write pointer is not outrunning the read pointer, the method 600 may store the new composite FD image block in the compressed image buffer, at activity 655. The method 600 may loop to activity 616 until all blocks of the newly-received image have been processed from the strip buffer and combined into the composite FD image, at activity 656.

In review, the method 600 includes receiving an image data stream associated with a first of a sequence of images, transforming image blocks from the image data stream to the frequency domain, entropy-encoding the blocks for further compression, and storing the blocks in a compressed image buffer. Image data streams associated with the first and subsequent images of the sequence may be, but need not be, received from an ISA. For example, the images may be received from a storage device.

Images received subsequent to the first of the sequence of images may be merged into the compressed image buffer via a different logical path than that of the first-received image. Each subsequent image is spatially transformed to bring pixels shifted by relative camera-to-scene motion into spatial alignment with the previously-stored composite image. Blocks from a subsequent image are composed using pixels indexed from the strip buffer using a set of affine-transformed coordinates as the indices. Blocks so composed from each subsequent image are merged with the existing contents of the compressed image buffer using the weighted average technique described above. The affine matrix is calculated from a set of vectors representing paths between positions, relative to a common image frame, of corresponding blocks selected from subsequent images. Derivation of the set of vectors is described here below.

Vectors representing pixel transposition from one image to a subsequent image in the sequence of images are calculated using portions of the method 600 described here below. A vector originates at a selected composite FD image block and terminates at a corresponding block in the newly-received image data stream. Selecting high-strength composite FD image blocks may help to assure positional accuracy in the derivation of the vectors and thus in the transposition of subsequently-received pixels for merging into the composite FD image.

Finding a high-strength selected composite FD image block in the compressed image buffer may include loading an entropy-encoded earlier-stored composite FD image block from the buffer, at activity 660. An entropy decoding operation may be performed on one or more high-order portions of the entropy-encoded earlier-stored composite FD image block, at activity 662. The entropy decoding operation may reveal a set of low-frequency coefficients associated with the earlier-stored composite FD image block.

The set of low-frequency coefficients may be used to calculate an image feature strength metric value associated with the earlier-stored composite FD image block, at activity 664. Low-frequency coefficients associated with an FD image block may represent significant image features, as previously mentioned. The image feature strength metric may comprise a mathematical operation performed on the set of low-frequency coefficients, or other operation calculated to measure image feature strength. For example, the mathematical operation may comprise a sum of the absolute values of the set of low-frequency coefficients in some embodiments.

The method 600 may continue at activity 668 with scanning a selected area of the compressed image buffer to find a high-strength, or highest strength earlier-stored composite FD image block. The highest-strength composite FD block is the block from the selected area of the compressed image buffer with an image feature strength metric value higher than that of any other FD image block from the selected area.

The selected composite FD image block may be stored in a region buffer associated with the selected area, at activity 670. The method 600 may also include performing an FD to SD transform operation on the selected composite FD image block to obtain an SD version of the selected composite FD image block, at activity 674.

The method 600 further includes searching within the search window for a candidate matching image block. Some embodiments may conduct the search by loading a set of highest-quality vectors from a table of vectors, at activity 676. Measures of vector quality may include the strength of a match between image blocks used to calculate the vector, an inverse of a measure of ambiguity, or both. The measure of ambiguity increases as a match strength associated with a next best candidate matching image block increases. That is, a vector associated with a block that is difficult to distinguish from another block may be considered to be of relatively lower quality than a vector associated with a less ambiguous block. The method 600 may initiate the search within the search window at an image block closest to a location corresponding to a median value of a set of destination coordinates associated with the set of highest-quality vectors, at activity 678.

The method 600 may also include measuring the strength of a match between the SD version of the selected composite FD image block and the candidate matching image block, at activity 682. The candidate matching image block may be selected as the matching image block if the candidate is the best match within the search window, at activity 684. That is, the candidate matching block may be selected if the strength of the match between the SD version of the selected composite FD image block and the candidate matching image block is greater than the strength of a match associated with any other candidate matching image block found in the search window. Various measures of match strength may be used, including an inverse of a sum of absolute differences operation or an inverse of a sum of squares of an absolute difference operation, among others.

The method 600 may further include calculating the vector between a position in a frame of an SD version of the selected composite FD image block and a position in the frame of a matching image block found in the search window. A set of coordinates associated with a pixel in the selected composite FD image block may be established as origination coordinates of the vector, at activity 688. A set of coordinates associated with a pixel in the matching image block in spatial correspondence with the pixel in the selected composite FD image block may be established as destination coordinates of the vector, at activity 690. The method 600 may include calculating the vector between the sets of coordinates, at activity 692.

The method 600 may include determining whether the strength of a match between the SD version of the selected composite FD image block and the matching image block is above a selected match threshold, at activity 694. If so, the vector may be stored in the vector table, at activity 696. If not, the vector may be discarded, at activity 698. The method 600 may search for additional vectors by branching back to activity 660 to scan another area of the compressed image buffer for another high-strength composite FD image block, at activity 699.

Vectors from the vector table may be used to calculate an affine matrix that is representative of relative camera-to-scene motion, as previously described. The affine matrix may be used to transpose coordinates of composite image pixels to generate coordinates of corresponding pixels in the strip buffer. The corresponding pixels indexed from the strip buffer are combined into the composite image to add luminance to the final composite image and to average out noise.

It is noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using well-known mechanisms, including application program interfaces, inter-process communication techniques, and remote procedure calls, among others. The teachings of various embodiments are not limited to any particular programming language or environment.

The apparatus, systems, and methods disclosed herein may increase the effective light sensitivity of an image capture device without an appreciable increase in pixel noise levels by performing a compositing operation in the frequency domain of a sequence of image frames captured in succession. Each successive image block is transposed in the spatial domain according to relative movement between the image capture device and the scene being captured to provide for image alignment notwithstanding the movement. Image capture devices with higher pixel densities and larger aperture ratings may result.

The accompanying figures that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, comprising:
   a strip buffer to temporarily store an image data stream associated with a new version of an image as the image data stream is received from an image sensor array (ISA);
   an image comparator to compare a selected set of low-frequency coefficients of a new frequency domain (FD) image block associated with the new version of the image to a corresponding set of low-frequency coefficients of an earlier-stored composite FD image block associated with at least one previously received version of the image; and
   combinational logic to combine the new FD image block with the earlier-stored composite FD image block to yield a new composite FD image block if the selected set of low-frequency coefficients of the new FD image block match the corresponding set of low-frequency coefficients of the earlier-stored composite FD image block within a match threshold.

2. The apparatus of claim 1, further comprising:
   a first domain translator coupled to the strip buffer to convert an earlier-received image block associated with a first-received image from a spatial domain to a frequency domain to yield an earlier-received FD image block.

3. The apparatus of claim 2, further comprising:
   a first entropy encoder operatively coupled to the first domain translator to entropy-encode the earlier-received FD image block to yield an entropy-encoded earlier-received FD image block and to store the entropy-encoded earlier-received FD image block in a compressed image buffer as an entropy-encoded earlier-stored composite FD image block.

4. The apparatus of claim 1, further comprising:
   a second domain translator coupled to the strip buffer to convert a block of pixel illuminance values selected from the image data stream from a spatial domain (SD) to a frequency domain using an SD to FD transform operation to yield the new FD image block.

5. The apparatus of claim 1, further comprising:
   averaging logic coupled to the combinational logic to compute a weighted average of an FD coefficient from the new FD image block and a corresponding FD coefficient from the earlier-stored composite FD image block, wherein a weight associated with the FD coefficient from the new FD image block comprises a value of one and wherein a weight associated with the corresponding FD coefficient from the earlier-stored composite FD image block comprises a number equal to a number of image frames composited into the earlier-stored composite FD image block.

6. The apparatus of claim 1, further comprising:
   a second entropy encoder coupled to the combinational logic to entropy-encode the new composite FD image block to yield an entropy-encoded new composite FD image block and to store the entropy-encoded new composite FD image block in a compressed image buffer.

7. The apparatus of claim 1, further comprising:
   a first entropy decoder coupled to the image comparator to perform an entropy decoding operation on an entropy-encoded earlier-stored composite FD image block to yield the earlier-stored composite FD image block.

8. The apparatus of claim 1, further comprising:
   transpositional logic operatively coupled to the strip buffer to perform a spatial transposition operation on a set of coordinates associated with a pixel within the earlier-stored composite FD image block to find a set of transposed coordinates associated with a corresponding pixel from the new version of the image.

9. The apparatus of claim 8, further comprising:
   an intra-block coordinate interpolator coupled to the transpositional logic to read a set of block positional coordinates associated with the earlier-stored composite FD image block and to determine the set of coordinates associated with the pixel within the earlier-stored composite FD image block, wherein each coordinate of the set of coordinates is calculated as an offset from a corresponding block positional coordinate.

10. The apparatus of claim 8, further comprising:
    an affine matrix calculator coupled to the transpositional logic to generate an affine matrix such that a set of coordinates of a set of starting points associated with at least one vector multiplied by the affine matrix results in a set of ending points associated with the at least one vector, wherein the at least one vector represents a path between a position in a frame of a previously-received image block associated with the at least one previously received version of the image and a position in the frame of a corresponding subsequently-received image block associated with the new version of the image.

11. The apparatus of claim 1, further comprising:
    motion matching logic operatively coupled to the strip buffer to calculate a vector between a position in a frame of a spatial domain (SD) version of the earlier-stored composite FD image block and a position in the frame of a matching image block found in a search window associated with the new version of the image and to store the vector in a vector table if a strength of a match between the SD version of the earlier-stored composite FD image block and the matching image block is above a selected match threshold.

12. The apparatus of claim 11, further comprising:
a search window buffer coupled to the strip buffer to store a set of pixels associated with the search window.

13. The apparatus of claim 11, further comprising:
image feature strength logic operatively coupled to the motion matching logic to scan a selected area of a compressed image buffer to find a highest strength earlier-stored composite FD image block with an image feature strength metric value higher than any other FD image block from the selected area by calculating an image feature strength metric value associated with the earlier-stored composite FD image block using a set of low-frequency coefficients from the earlier-stored composite FD image block; and
a region buffer associated with the selected area to store the highest strength earlier-stored composite FD image block.

14. The apparatus of claim 13, further comprising:
a second entropy decoder coupled to the image feature strength logic to load an entropy-encoded earlier-stored composite FD image block from the compressed image buffer and to perform an entropy decoding operation on at least a high-order portion of the entropy-encoded earlier-stored composite FD image block to reveal the set of low-frequency coefficients of the earlier-stored composite FD image block.

15. A method, comprising:
using hardware-based circuitry to perform the steps of:
comparing a selected set of low-frequency coefficients of a new frequency domain (FD) image block from an image data stream associated with a new version of an image to a corresponding set of low-frequency coefficients of an earlier-stored composite FD image block associated with at least one previously received version of the image; and
combining the new FD image block with the earlier-stored composite FD image block to yield a new composite FD image block if the set of low-frequency coefficients of the new FD image block match the set of low-frequency coefficients of the earlier-stored composite FD image block within a match threshold.

16. The method of claim 15, further comprising:
receiving sequential portions of an image data stream from an image sensor array (ISA); and
storing the sequential portions of the image data stream in a strip buffer as the portions are received from the ISA.

17. The method of claim 15, wherein the entropy-encoded earlier-stored composite FD image block comprises a joint photographic experts group (JPEG) image block.

18. The method of claim 15, further comprising:
calculating a weighted average of an FD coefficient from the new FD image block and a corresponding FD coefficient from the earlier-stored composite FD image block, wherein a weight associated with the FD coefficient from the new FD image block comprises a value of one and wherein a weight associated with the corresponding FD coefficient from the earlier-stored composite FD image block comprises a number equal to a number of image frames composited into the earlier-stored composite FD image block; and
using the weighted average to combine the new FD image block with the earlier-stored composite FD image block.

19. The method of claim 15, wherein the earlier-stored composite FD image block is associated with at least one previously-captured frame of an image and wherein the new FD image block is associated with a next-captured frame of the image.

20. The method of claim 15, further comprising:
performing an entropy decoding operation on an entropy-encoded earlier-stored composite FD image block to yield the earlier-stored composite FD image block.

21. The method of claim 15, further comprising:
reading a set of block positional coordinates associated with the earlier-stored composite FD image block; and
determining a set of pixel coordinates associated with at least one pixel within the earlier-stored composite FD image block, the set of pixel coordinates calculated as offsets from the set of block positional coordinates.

22. The method of claim 21, further comprising:
performing a spatial transposition operation on the set of coordinates associated with the at least one pixel from the earlier-stored composite FD image block to find a set of coordinates associated with a set of pixels from the image data stream such that the set of pixels from the image data stream are in approximate spatial alignment with pixels associated with a spatial domain version of the earlier-stored composite FD image block; and
selecting the set of pixels from the image data stream to form a new image block.

23. The method of claim 15, further comprising:
calculating an affine matrix such that a set of coordinates of a set of starting points associated with at least one vector multiplied by the affine matrix results in a set of ending points associated with the at least one vector, wherein the at least one vector represents a path between a position in a frame of a previously-received image block and a corresponding position in the frame of a subsequently-received image block.

24. The method of claim 15, further comprising:
entropy-encoding the new composite FD image block to yield an entropy-encoded new composite FD image block; and
storing the entropy-encoded new composite FD image block in a compressed image buffer.

25. The method of claim 15, further comprising:
discarding the new FD image block if the set of low-frequency coefficients of the new FD image block do not match the set of low-frequency coefficients of the earlier-stored composite FD image block within the match threshold, leaving the earlier-stored composite FD image block as the new composite FD image block.

26. The method of claim 15, further comprising:
loading an entropy-encoded earlier-stored composite FD image block from a compressed image buffer;
performing an entropy decoding operation on at least a high-order portion of the entropy-encoded earlier-stored composite FD image block to reveal a set of low-frequency coefficients of the earlier-stored composite FD image block; and
calculating an image feature strength metric value associated with the earlier-stored composite FD image block using the set of low-frequency coefficients.

27. The method of claim 15, further comprising:
calculating a vector between a position in a frame of a spatial domain (SD) version of the selected composite FD image block and a position in the frame of a matching image block found in a search window of an image represented by the image data stream; and storing the vector in a vector table if a strength of a match between the SD version of the selected composite FD image block and the matching image block is above a selected match threshold.

28. The method of claim 27, further comprising:

performing an FD to SD transform operation on the selected composite FD image block to obtain the SD version of the selected composite FD image block;

conducting a search of the search window for a candidate matching image block;

measuring a strength of a match between the SD version of the selected composite FD image block and the candidate matching image block; and selecting the candidate matching image block as the matching image block if the strength of the match between the SD version of the selected composite FD image block and the candidate matching image block is greater than a strength of a match associated with any other candidate matching image block found in the search window.

29. The method of claim 28, further comprising:

utilizing at least one of an inverse of a sum of absolute differences operation or an inverse of a sum of squares of an absolute difference operation to measure a match strength characteristic.

30. The method of claim 28, further comprising:

establishing a set of origination coordinates of the vector as a set of coordinates associated with a pixel in the SD version of the selected composite FD image block; and establishing a set of destination coordinates of the vector as a set of coordinates associated with a pixel in the matching image block, wherein the pixel in the matching image block is in spatial correspondence with the pixel in the selected composite FD image block.

31. The method of claim 28, further comprising:

loading a set of high-quality vectors from a table of vectors; and initiating the search within the search window at an image block closest to a location corresponding to a median value of a set of destination coordinates associated with the set of high-quality vectors.

* * * * *